United States Patent
Tanaka et al.

(10) Patent No.: US 10,508,389 B2
(45) Date of Patent: Dec. 17, 2019

(54) SEPARATOR FOR ELECTROCHEMICAL ELEMENT AND ELECTROCHEMICAL ELEMENT

(71) Applicant: NIPPON KODOSHI CORPORATION, Kochi-shi (JP)

(72) Inventors: Kosuke Tanaka, Kochi (JP); Norihiro Wada, Kochi (JP); Atsushi Igawa, Kochi (JP)

(73) Assignee: NIPPON KODOSHI CORPORATION, Kochi-shi (JP)

(*) Notice: Subject to any disclaimer, the term of this patent is extended or adjusted under 35 U.S.C. 154(b) by 13 days.

(21) Appl. No.: 15/760,476

(22) PCT Filed: Sep. 15, 2016

(86) PCT No.: PCT/JP2016/077277
§ 371 (c)(1),
(2) Date: Mar. 15, 2018

(87) PCT Pub. No.: WO2017/047699
PCT Pub. Date: Mar. 23, 2017

(65) Prior Publication Data
US 2018/0274174 A1    Sep. 27, 2018

(30) Foreign Application Priority Data

Sep. 17, 2015 (JP) ................................ 2015-184416

(51) Int. Cl.
| | |
|---|---|
| *H01M 2/16* | (2006.01) |
| *D21H 15/10* | (2006.01) |
| *D21H 27/00* | (2006.01) |
| *D21H 11/12* | (2006.01) |
| *H01G 9/02* | (2006.01) |
| *H01G 11/52* | (2013.01) |
| *D21H 11/14* | (2006.01) |

(52) U.S. Cl.
CPC ............. *D21H 15/10* (2013.01); *D21H 11/12* (2013.01); *D21H 11/14* (2013.01); *D21H 27/00* (2013.01); *H01G 9/02* (2013.01); *H01G 11/52* (2013.01); *H01M 2/1626* (2013.01)

(58) Field of Classification Search
CPC ........ D21H 15/10; D21H 11/12; D21H 11/14; D21H 27/00; H01G 11/52; H01G 9/02; H01M 2/16; H01M 6/16; H01M 10/0525; Y02E 60/13
See application file for complete search history.

(56) References Cited

U.S. PATENT DOCUMENTS

| | | | |
|---|---|---|---|
| 2002/0004973 A1* | 1/2002 | Suhara | ...................... H01G 9/02 29/25.03 |
| 2006/0014080 A1 | 1/2006 | Kubo et al. | |
| 2015/0294801 A1* | 10/2015 | Hayakawa | ............. H01G 11/52 361/502 |

FOREIGN PATENT DOCUMENTS

| | | |
|---|---|---|
| JP | 5-267103 A | 10/1993 |
| JP | 9-45586 A | 2/1997 |
| JP | 2006-4844 A | 1/2006 |
| JP | 2012-221566 A | 11/2012 |
| JP | 2013-246926 A | 12/2013 |
| JP | 2014-56953 A | 3/2014 |
| JP | 2014056953 | * 3/2014 |
| JP | 2015-60702 A | 3/2015 |

OTHER PUBLICATIONS

JP2014056953MT (Year: 2014).*
JP2013246928MT (Year: 2013).*
International Search Report dated Nov. 29, 2016, in PCT/JP2016/077277 filed Sep. 15, 2016.

* cited by examiner

*Primary Examiner* — Alexander Usyatinsky
(74) *Attorney, Agent, or Firm* — Oblon, McClelland, Maier & Neustadt, L.L.P.

(57) ABSTRACT

Provided is a separator for an electrochemical element, the separator having improved tensile strength and short-circuit resistance while maintaining the impedance characteristics and denseness expected of a separator comprising highly beaten regenerated cellulose fibers. The separator for an electrochemical element is interposed between a pair of electrodes and capable of holding an electrolytic solution containing an electrolyte, the separator for an electrochemical element comprising: 20 to 80 mass % of natural cellulose fibers A in which the length weighted average fiber length is 0.30 to 1.19 mm and the CSF is 500 to 50 ml; 10 to 50 mass % of natural cellulose fibers B in which the length weighted average fiber length and the maximum distribution fiber length are 1.20 to 1.99 mm and the CSF is 500 to 50 ml; and 10 to 50 mass % of beaten regenerated cellulose fibers.

11 Claims, No Drawings

SEPARATOR FOR ELECTROCHEMICAL ELEMENT AND ELECTROCHEMICAL ELEMENT

TECHNICAL FIELD

The present invention relates to a separator for an electrochemical element, and an electrochemical element including the separator for an electrochemical element.

BACKGROUND ART

Examples of electrochemical elements include aluminum electrolytic capacitors, conductive polymer aluminum solid electrolytic capacitors, conductive polymer hybrid aluminum electrolytic capacitors, electric double-layer capacitors, lithium-ion capacitors, lithium-ion secondary batteries, and lithium primary batteries.

A separator in an electrochemical element serves to isolate both electrodes from each other and to hold an electrolytic solution. To isolate both foil electrodes, the separator is required to combine high shielding properties with low resistance. The material of the separator is required to have electrical insulation. To hold various types of electrolytic solution, the material is required to have hydrophilicity and lipophilicity.

Cellulose has these properties. Cellulose paper has long been used as a separator for an electrochemical element. Among cellulose fibers, beatable regenerated cellulose fibers are characterized by generating fibrils having high stiffness and a small fiber diameter when highly beaten. It is known that the use of beaten regenerated cellulose fibers can produce a microporous, highly dense separator. In recent years, thus, separators formed of beatable regenerated cellulose fibers have often been reported.

PTL 1 discloses a method in which beatable regenerated cellulose fibers are used in order to improve the denseness and the impedance characteristics of a separator. The separator produced by the use of the beaten regenerated cellulose fibers is formed of highly dense, microporous paper. In the case of producing aluminum electrolytic capacitors using the separators, the percentage of defective products due to short circuits is reduced, and the impedance characteristics are improved.

However, when a separator composed of 100% by mass of beatable regenerated cellulose fibers is used as described in PTL 1, because the separator is low in tensile strength and tear strength, the separator is sometimes broken in a process for producing an aluminum electrolytic capacitor. The separator has low strength and thus has low resistance to portions, such as tab portions and foil burrs, of the aluminum electrolytic capacitor that applies stress thereto, causing breakage of the separator to cause a short circuit, in some cases.

PTL 1 also discloses that an abaca pulp, a sisal hemp pulp, and so forth are mixed with the beatable regenerated cellulose fibers. PTL 2 discloses a separator for an electric double-layer capacitor, the separator being formed of solvent spun rayon, which is categorized into beatable regenerated cellulose fibers, and a sisal pulp.

When beatable regenerated cellulose fibers are mixed with the abaca pulp and the sisal hemp pulp, the tensile strength and the tear strength are improved; however, the formation of the separator is disadvantageously degraded because the abaca pulp and the sisal hemp pulp that are little beaten and that have a high CSF value have long fiber lengths. Long fiber lengths make it more difficult to uniformly disperse the fibers in water, causing difficulty in forming a uniform paper sheet during papermaking. To improve the formation, it is necessary to promote the beating of the abaca pulp and the sisal hemp pulp to shorten the fiber lengths. However, when the abaca pulp and the sisal hemp pulp are beaten, the impedance characteristics are markedly degraded; thus, substantially no beating has been performed.

PTL 3 discloses a separator for an electrochemical element, the separator being composed of cellulose fibers obtained by specifying the freeness, the length-weighted average fiber length, and the pattern of the fiber length distribution histogram of solvent spun cellulose fibers.

However, the percentage of the solvent spun rayon is preferably 80% or more in view of the holding of an electrolytic solution. The percentage of the solvent spun rayon contained is high, thereby resulting in the low-strength separator. The separator is inevitably broken in a process for producing an electrochemical element.

PTL 3 also discloses a cylindrical separator containing 10% to 25% linters having a modified freeness of 270 ml (about 30 ml in terms of CSF) and a cylindrical separator containing 25% abaca fibers having a modified freeness of 820 ml (about 730 ml in terms of CSF). Highly beaten linters have poor impedance characteristics, and the fibers are curly and thus have insufficient strength. The abaca fibers are in an unbeaten state. Thus, a highly dense separator cannot be produced. In the case of a separator produced with a cylinder paper machine, the formation of pinholes attributed to the wire pattern of a cylinder during papermaking is inevitable. Thus, the technique is not appropriate for the production of a highly dense separator.

PTL 4 discloses a separator for a capacitor, the separator being formed of solvent spun cellulose fibers and solvent spun cellulose short fibers having specified freeness and length-weighted average fiber length. The solvent spun cellulose short fibers used here are not beaten and thus are straight fibers having a fiber length of 3 to 5 mm. A higher content of unbeaten solvent spun cellulose fibers results in decreases in the strength and denseness of paper because the entanglement of the fibers does not occur. In PTL 4, the solvent spun cellulose short fibers are used to improve the transfer state of a wet web to felt. Attempts to improve the strength and the denseness by beating are highly likely to degrade the transfer state of the wet web.

PTL 5 discloses a separator for a lithium-ion secondary battery, the separator containing 10% to 30% by mass fibrillated solvent spun cellulose fibers, 40% to 50% by mass oriented, crystallized polyester short fibers having an average fiber diameter of 2.0 to 3.5 µm, and 30% to 40% by mass unstretched polyester short fibers, serving as a binder, having an average fiber diameter of 5.0 µm or less.

Hydrogen bonds, which are key factors for the strength of paper, are formed between cellulose fibers, but are not formed between the solvent spun cellulose and the oriented, crystallized polyester short fibers. Thus, for the purpose of holding the form of paper, the thermally fusible unstretched polyester short fibers for a binder are contained. The oriented, crystallized polyester short fibers and the unstretched polyester short fibers for a binder are straight fibers. The high contents of these synthetic fibers make it difficult to increase the denseness of the separator having the composition described in PTL 5. If the conditions of hot calender treatment are adjusted to promote the fusion of the binder fibers, the denseness can be increased. However, the binder fibers are transformed into films; thus, the impedance characteristics are markedly degraded. Cellulose is a material having a decomposition temperature of about 260° C., no softening point, and thus good heat resistance. When a common synthetic fibers are used, the degradation of the heat resistance of the separator is inevitable.

CITATION LIST

Patent Literature

PTL 1: Japanese Unexamined Patent Application Publication No. 5-267103
PTL 2: Japanese Unexamined Patent Application Publication No. 9-45586
PTL 3: Japanese Unexamined Patent Application Publication No. 2012-221566
PTL 4: Japanese Unexamined Patent Application Publication No. 2014-56953
PTL 5: Japanese Unexamined Patent Application Publication No. 2015-60702

SUMMARY OF INVENTION

Technical Problem

As described above, separators formed of highly beaten regenerated cellulose fibers have high denseness but disadvantageously have low tensile strength and low tear strength. Many attempts to solve the problems have been made by mixing different materials with regenerated cellulose. However, in any attempt, the denseness is decreased in exchange for an improvement in strength, or the impedance characteristics are markedly degraded in exchange for achieving good strength and denseness. There is no report that good strength, denseness, and impedance characteristics are provided.

The present invention has been accomplished in light of the foregoing problems. It is an object of the present invention to provide a separator for an electrochemical element, the separator having improved tensile strength and short-circuit resistance, while maintaining the denseness and the impedance characteristics comparable to those of a separator formed of highly beaten regenerated cellulose fibers. It is another object of the present invention to provide a miniaturized or higher-capacity electrochemical element including the separator for an electrochemical element, the electrochemical element having improved productivity and an improved percentage of defective products due to short circuits.

Solution to Problem

A separator for an electrochemical element according to the present invention, the separator being interposed between a pair of electrodes and capable of holding an electrolytic solution containing an electrolyte, includes 20% to 80% by mass of natural cellulose fibers A having a length-weighted average fiber length of 0.30 to 1.19 mm and a CSF of 500 to 50 ml, 10% to 50% by mass of natural cellulose fibers B having a length-weighted average fiber length of 1.20 to 1.99 mm, a maximum distribution fiber length of 1.20 to 1.99 mm, and a CSF of 500 to 50 ml, and 10% to 50% by mass of beaten regenerated cellulose fibers.

The natural cellulose fibers A used for the separator for an electrochemical element according to the present invention are preferably at least one selected from hardwood pulps, esparto pulps, and straw pulps.

As a method for producing the foregoing pulps, for example, the kraft process, the sulfite process, or the soda process can be employed. A dissolving pulp and a mercerized pulp, as well as a usual paper pulp, may be used.

The natural cellulose fibers B used for the separator for an electrochemical element according to the present invention are preferably at least one selected from sisal hemp pulps, jute pulps, kenaf pulps, and bamboo pulps.

As a method for producing the foregoing pulps, for example, the kraft process, the sulfite process, or the soda process can be employed. A dissolving pulp and a mercerized pulp, as well as a visual paper pulp, may be used.

The separator for an electrochemical element according to the present invention preferably has a thickness of 15 to 100 μm and a density of 0.30 to 0.80 g/cm$^3$.

An electrochemical element according to the present invention includes the foregoing separator for an electrochemical element according to the present invention. The electrochemical element according to the present invention is preferably selected from aluminum electrolytic capacitors, conductive polymer aluminum solid electrolytic capacitors, conductive polymer hybrid aluminum electrolytic capacitors, electric double-layer capacitors, lithium-ion capacitors, lithium-ion secondary batteries, and lithium primary batteries.

Advantageous Effects of Invention

According to the present invention, the separator for an electrochemical element is provided, the separator having good denseness, impedance characteristics, tensile strength, and short-circuit resistance. The use of the separator provides the miniaturized or higher-capacity electrochemical element having improved productivity and an improved percentage of defective products due to short circuits.

DESCRIPTION OF EMBODIMENTS

Embodiments of the present invention will be described in detail below.

Various materials and compositions have been studied in addition to those described in the embodiments and examples. It has been found that when a material containing natural cellulose fibers A, natural cellulose fibers B, and beaten regenerated cellulose fibers is formed into paper on a Fourdrinier machine, good results are obtained, in which the natural cellulose fibers A easily provide good formation because of their short length-weighted average fiber lengths and provide higher tensile strength than that of the case of using beatable regenerated cellulose fibers, and in which the natural cellulose fibers B are shorter in length-weighted average fiber length and are more highly beaten than those of natural cellulose fibers that have been used as a material to be mixed with regenerated cellulose fibers.

When the ternary system material containing the natural cellulose fibers A having the effects of improving the formation and the tensile strength, the natural cellulose fibers B having the effect of markedly improving the tensile strength, and the regenerated cellulose fibers that provide good denseness, these fibers being mixed together under optimum conditions, is formed into paper with the Fourdrinier machine, the tensile strength and the short-circuit resistance can be improved while maintaining the denseness and the impedance characteristics comparable to those of separators formed of highly beaten regenerated cellulose fibers.

The use of a material consisting of only the natural cellulose fibers A and the regenerated cellulose fibers makes it difficult to sufficiently improve the strength of a separator. The use of a material consisting of only the natural cellulose fibers B and the regenerated cellulose fibers improves the strength of a separator but makes it difficult to achieve denseness and impedance characteristics with sufficient levels for practical use.

Only the use of the three components of the natural cellulose fibers A having the effects of improving the formation and the tensile strength, the natural cellulose fibers B having the effect of markedly improving the tensile strength, and the regenerated cellulose fibers that provide good denseness improves the workability in the production of a capacitor element and provides both of a good percent defective and good impedance characteristics of the capacitor.

In the case where a paper machine, such as a cylinder paper machine, a tanmo paper machine, or a former, which performs drainage and paper-sheet formation in a short time, is used, fibers are deposited on opening portions of a papermaking wire but are not easily deposited on a wire portion. Portions where the fibers are not deposited are called as pinholes and easily cause an electrochemical element to short-circuit.

In contrast, in the case of a Fourdrinier machine, because slow drainage is performed with a long papermaking wire, fibers are deposited on the wire portion of the papermaking wire, thus forming a dense paper sheet free of pinholes.

The separator for an electrochemical element according to the present invention preferably includes at least one ply formed on a Fourdrinier machine. The separator may be formed of only a single ply formed on the Fourdrinier machine. Alternatively, the separator may be formed of a multi ply sheet including the ply and a ply formed on, for example, a cylinder paper machine, a tanmo paper machine, or a former. Regarding the ply that has not been formed on the Fourdrinier machine, any of natural cellulose fibers or beatable regenerated cellulose fibers that can be formed into paper on any papermaking machine may be used without specifying the length-weighted average fiber length or the degree of beating.

In the separator for an electrochemical element according to the present invention, 20% to 80% by mass of a pulp having a length-weighted average fiber length of 0.30 to 1.19 mm and a CSF of 500 to 50 ml is used as the natural cellulose fibers A.

At a length-weighted average fiber length of less than 0.30 mm, the tensile strength is not easily improved. With the effect of the short fiber length, the tear strength is easily decreased. At a length-weighted average fiber length of more than 1.19 mm, the formation is easily degraded, and the short-circuit resistance is easily decreased. A CSF value of more than 500 ml makes it difficult to provide uniform formation, thus easily causing the formation of pinholes. When beating is performed in such a manner that the CSP value is less than 50 ml, the impedance characteristics are easily degraded.

At a proportion of the natural cellulose fibers A of less than 20% by mass, the formation is easily degraded because of excessive proportions of the other components. At a proportion of the natural cellulose fibers A of more than 80% by mass, the tensile strength and the short-circuit resistance cannot be ensured because of insufficient proportions of the other components. Because the effect of the natural cellulose fibers A on the tensile strength is smaller than that of the natural cellulose fibers B, the maximum distribution fiber length is not particularly specified; however, the maximum distribution fiber length is preferably 1.60 mm or less in view of an effect on the formation.

The natural cellulose fibers A are preferably selected from hardwood pulps, esparto pulps, and straw pulps. As a method for producing the foregoing pulps, for example, the kraft process, the sulfite process, or the soda process can be employed. A dissolving pulp and a mercerized pulp, as well as a usual paper pulp, may be used. The pulps may or may not be bleached. These pulps may be used alone or in combination of two or more.

In the separator for an electrochemical element according to the present invention, 10% to 50% by mass of a pulp having a length weighted average fiber length of 1.20 to 1.99 mm, a maximum distribution fiber length of 1.20 to 1.99 mm, and a CSF of 500 to 50 ml is used as the natural cellulose fibers B.

When each of the length-weighted average fiber length and the maximum distribution fiber length is less than 1.20 mm, the tensile strength is not easily improved. When each of the length-weighted average fiber length and the maximum distribution fiber length is more than 1.99 mm, the formation is degraded to easily decrease the short-circuit resistance. A CSF of more than 500 ml easily results in the degradation of the formation. A CSF of less than 50 ml easily results in the degradation of the impedance characteristics.

At a proportion of the natural cellulose fibers B of less than 10% by mass, the tensile strength is not easily improved. At a proportion of the natural cellulose fibers E of more than 50% by mass, the formation is easily degraded.

Fibers having a length-weighted average fiber length of a value in the range of 1.20 to 1.99 mm and a maximum distribution fiber length of a value outside the range of 1.20 to 1.99 mm often exhibits a broad fiber length distribution or a fiber length distribution having two large peaks: short fibers about 0.2 mm in length and a main fiber portion. In the case of the broad fiber length distribution, because short to long fibers are relatively uniformly contained, the tensile strength tends to be less likely to be improved, and the formation tends to be easily degraded. In the case of the fiber length distribution having two large fiber length peaks of the short fibers and the main fiber portion, the degradation of impedance characteristics due to a large amount of the short fibers and the degradation of the formation due to the long main fibers are easily caused. In contrast, in the case of the fibers having a length-weighted average fiber length of 1.20 to 1.99 mm and a maximum distribution fiber length of 1.20 to 1.99 mm, the proportion of short fibers about 0.2 mm in length is low, and a relatively clear fiber length peak is observed at the main fiber portion; thus, the tensile strength is easily improved, and the degradation of the impedance characteristics can be inhibited.

The natural cellulose fibers B are preferably selected from sisal hemp pulps, jute pulps, kenaf pulps, and bamboo pulps. As a method for producing the foregoing pulps, for example, the kraft process, the sulfite process, or the soda process can be employed. A dissolving pulp and a mercerized pulp, as well as a usual paper pulp, may be used. The pulps may or may not be bleached. These pulps may be used alone or in combination of two or more.

In the separator for an electrochemical element according to the present invention, 10% to 50% by mass of beaten regenerated cellulose fibers are used. A proportion of the beaten regenerated cellulose fibers of less than 10% by mass results in a decrease in denseness, failing to ensure the short-circuit resistance. A proportion of the beaten regenerated cellulose fibers of more than 50% by mass results in a decrease in the proportions of the other components, making it difficult to improve the tensile strength.

The beaten regenerated cellulose fibers preferably have a length-weighted average fiber length of 0.20 to 1.99 mm. The degree of beating of the beaten regenerated cellulose fibers is preferably more than 100 ml in terms of the CSF value. A length-weighted average fiber length of less than 0.20 mm easily results in a decrease in tensile strength. Furthermore, the proportion of fibers passing through the papermaking wire together with water is increased to decrease the yield. A length-weighted average fiber length of more than 1.99 mm easily results in the degradation of the formation.

If beating treatment does not proceed to a CSF value of more than 100 ml, the generation of fibrils is insufficient; thus, the denseness is insufficient, failing to ensure the short-circuit resistance. Regardless of natural cellulose fibers or beatable regenerated cellulose fibers, when the beating treatment proceeds to a high level, the CSF value reaches 0 ml. When the beating treatment proceeds further, the amount of fine fibers passing through openings of a sieve board is increased to increase the CSF value. Regenerated cellulose fibers whose CSF value is increased to more than 100 ml can be used as beaten regenerated cellulose fibers without problems in the present invention. However, when the CSF is increased to more than 500 ml, the fibers become too small; thus, the fibers are not appropriate for a material for papermaking.

Examples of regenerated cellulose fibers that can be used for the separator for an electrochemical element according to the present invention include, but are not limited to, solvent spun rayon such as lyocell and polynosic rayon. Any beaten regenerated cellulose fibers may be used.

As an apparatus for beating fibers used in the present invention, any apparatus used to prepare a usual papermaking material may be used. Typical examples thereof include beaters, conical refiners, disc refiners, and high pressure homogenizers. Regarding the fibers used in the present invention, the fibers may be beaten separately and mixed together before papermaking. Alternatively, a fiber mixture may be beaten.

When paper used in the separator for an electrochemical element according to the present invention is produced, commonly used additives such as a dispersant, an antifoaming agent, and a paper strength additive may be used in a papermaking process, as needed. A paper strength additive such as polyacrylamide may be applied, as needed.

The separator for an electrochemical element according to the present invention preferably has a thickness of 15 to 100 μm and a density of 0.30 to 0.80 g/cm$^3$. To control the thickness and the density, calender treatment may be used, as needed. A thickness of less than 15 μm or a density of less than 0.30 g/cm$^3$ results in a decrease in mechanical strength to cause a separator to break easily in a process for producing a separator or a process for producing an electrochemical element. A small thickness results in a decrease in interelectrode distance, and a low density results in a decrease in denseness, thus failing to ensure the short-circuit resistance. A thickness of more than 100 μm results in an increase in the proportion of the separator in the electrochemical element, which is disadvantageous to higher capacity. Furthermore, because the interelectrode distance is increased, the impedance characteristics are easily degraded. At a density of more than 0.80 g/cm$^3$, pores in the separator are decreased to inhibit the permeation of ions, markedly degrading the impedance characteristics.

An electrochemical element according to the present invention can be produced using the separator for an electrochemical element according to the present invention.

The electrochemical element according to the present invention is preferably selected from aluminum electrolytic capacitors, conductive polymer aluminum solid electrolytic capacitors, conductive polymer hybrid aluminum electrolytic capacitors, electric double-layer capacitors, lithium-ion capacitors, lithium-ion secondary batteries, and lithium primary batteries.

[Evaluation Method]

Specific measurements of characteristics of papermaking materials, separators, aluminum electrolytic capacitors, and electric double-layer capacitors according to the embodiments were performed by methods under conditions described below.

[Length-Weighted Average Fiber Length and Maximum Distribution Fiber Length]

A length-weighted average fiber length is the value of a contour length (the length of the center line of a fiber) measured with a Kajaani Fiberlab Ver. 4 (available from Metso Automation) according to JIS P8226-2 "Pulps—Determination of fiber length by automated optical analysis—Part 2: Unpolarized light method" (ISO 16065-2). A maximum distribution fiber length is the value of a length range that exhibits the maximum percentage by number of fibers among length ranges classified every 0.05 mm (for example, a 1.00-mm-length range includes fibers having a length of more than 0.95 mm and 1.00 mm or less).

[CSF]

A CSF value was measured according to JIS P8121-2 "Pulps—Determination of drainability—Part 2: Canadian Standard freeness method".

[Thickness]

The thickness of a separator was measured by a method in which a sample is folded into 10 layers, the method being described in "5.1.3 Case where paper is folded and the thickness of the folded paper is measured" with a micrometer specified in "5.1.1 Measurement instrument and measurement method, a. Case of using micrometer for external measurement" described in JIS C2300-2 "Cellulosic papers for electrical purposes—Part 2: Methods of test, 5.1 Thickness".

[Density]

The density of a separator in an absolute dry condition was measured by method B specified in JIS C2300-2 "Cellulosic papers for electrical purposes—Part 2: Methods of test, 7.0A Density".

[Tensile Strength]

The tensile strength of a separator in the longitudinal direction was measured by a method specified in JIS C 2300-2 "Cellulosic papers for electrical purposes—Part 2: Methods of test, 8. Tensile strength and elongation".

[Method for Producing Aluminum Electrolytic Capacitor]

Anodic aluminum foil subjected to etching treatment and oxide film formation treatment and cathodic aluminum foil were wound with a separator provided therebetween so as not to come into contact with each other to produce a capacitor element. The capacitor element was impregnated with a predetermined electrolytic solution, placed in a case, and sealed to produce an aluminum electrolytic capacitor having a diameter of 10 mm, a height of 20 mm, and a rated voltage of 63 WV or 450 WV. A constant length of the anodic aluminum foil was used for the production of the capacitor element.

[Workability during Production of Aluminum Electrolytic Capacitor Element]

When 1,000 capacitor elements were produced for each sample, the number of occurrences of separator breakage was measured under the same production conditions. A sample in which the number of occurrences was 1 or less was rated as ○. A sample in which the number of occurrences was 4 or less was rated as Δ. A sample in which the number of occurrences was 5 or more was rated as x.
[Percent Defective of Aluminum Electrolytic Capacitor After Aging]

The aging of 1,000 capacitors for each sample was performed by gradually increasing the voltage to about 110% of the rated voltage. The number of defective capacitors including aging short circuits, actuated explosion-proof valves, fluid leakage, and abnormal appearances such as the swelling of sealing portions was divided by 1,000. The resulting value was expressed in terms of percentage and was used as a percent defective.

[Impedance of Aluminum Electrolytic Capacitor]

The impedance of an aluminum electrolytic capacitor was measured with an LCR meter at 20° C. and a frequency of 100 kHz.

[Method for Producing Electric Double-Layer Capacitor]

Activated carbon electrodes and a separator according to the present invention were wound to form an electric double-layer capacitor element. The element was placed in a cylindrical aluminum case with a bottom. An electrolytic solution containing tetraethylammonium tetrafluoroborate, serving as an electrolyte, dissolved in a propylene carbonate solvent was injected thereinto. After vacuum impregnation was performed, the case was sealed with sealing rubber to produce an electric double-layer capacitor (10 mm in diameter×35 mm in length) having a rated voltage of 2.5 V and a rated capacity of 10 F.

[Workability During Production of Electric Double-Layer Capacitor Element]

When 1,000 electric double-layer capacitor elements were produced for each sample, the number of occurrences of separator breakage was measured under the same production conditions. A sample in which the number of occurrences was 1 or less was rated as ○. A sample in which the number of occurrences was 4 or less was rated as Δ. A sample in which the number of occurrences was 5 or more was rated as x.

[Internal Resistance]

The internal resistance of an electric double-layer capacitor was measured by an alternating-current (a.c.) resistance method specified in "4.6 Internal resistance" of JIS C5160-1 "Fixed electric double-layer capacitors for use in electronic equipment".

[Leakage Current of Electric Double-Layer Capacitor]

The leakage current of an electric double-layer capacitor was measured under a condition of a voltage application time of 30 minutes according to "4.7 Leakage current" of JIS C5160-1 "Fixed electric double-layer capacitors for use in electronic equipment".

[Percentage of Defective Electric Double-Layer Capacitor Due to Short Circuit]

Regarding 1,000 electric double-layer capacitors for each sample, capacitors in which a charging voltage was not increased to a rated voltage were regarded as defective capacitors of short circuits. The number of the defective capacitors was divided by 1,000. The resulting value was expressed in terms of percentage and was used as a percent defective.

EXAMPLES

Specific examples according to the present invention, comparative examples, and conventional example will be described below.

Example 1

A material mixture was formed into paper on a Fourdrinier machine to provide a separator having a thickness of 34.6 μm, a density of 0.48 g/cm$^3$, and a tensile strength of 16.7 N/15 mm, the material mixture containing 40% by mass of a hardwood kraft pulp, serving as natural cellulose fibers A, having a length-weighted average fiber length of 0.72 mm and a CSF of 480 ml, 10% by mass of a sisal pulp, serving as natural cellulose fibers B, having a length-weighted average fiber length of 1.96 mm, a maximum distribution fiber length of 1.90 mm, and a CSF of 490 ml, and 50% by mass of lyocell fibers, serving as beaten regenerated cellulose fibers, having a length-weighted average fiber length of 0.65 mm, the lyocell fibers being beaten until the CSF value was 120 ml after the CSF reached 0 ml.

Example 2

A material mixture was formed into paper on a Fourdrinier machine, the material mixture containing 20% by mass of a hardwood sulfite pulp, serving as natural cellulose fibers A, having a length-weighted average fiber length of 0.33 mm and a CSF of 55 ml, 50% by mass of kenaf pulp, serving as natural cellulose fibers B, having a length-weighted average fiber length of 1.24 mm, a maximum distribution fiber length of 1.25 mm, and a CSF of 55 ml, and 30% by mass of polynosic rayon fibers, serving as beaten regenerated cellulose fibers, having a length-weighted average fiber length of 1.79 mm and a CSF of 48 ml. Then the resulting paper was subjected to calender treatment to provide a separator having a thickness of 15.3 μm, a density of 0.78 g/cm$^3$, and a tensile strength of 23.5 N/15 mm.

Example 3

A material mixture was formed into paper on a Fourdrinier machine to provide a separator having a thickness of 35.4 μm, a density of 0.45 g/cm$^3$, a tensile strength of 18.6 N/15 mm, the material mixture containing 50% by mass of a hardwood dissolving pulp, serving as natural cellulose fibers A, having a length-weighted average fiber length of 0.62 mm and a CSF of 250 ml, 20% by mass of a jute pulp, serving as natural cellulose fibers B, having a length weighted average fiber length of 1.33 mm, a maximum distribution fiber length of 1.40 mm, and a CSF of 270 ml, and 30% by mass of lyocell fibers, serving as beaten regenerated cellulose fibers, having a length-weighted average fiber length of 1.06 mm and a CSF of 0 ml.

Example 4

A material mixture was formed into paper on a Fourdrinier machine to provide a separator having a thickness of 60.2 μm, a density of 0.31 g/cm$^3$, and a tensile strength of 15.7 N/15 mm, the material mixture containing 80% by mass of a hardwood mercerized pulp, serving as natural cellulose fibers A, having a length-weighted average fiber length of 0.66 mm and a CSF of 450 ml, 10% by mass of a jute pulp, serving as natural cellulose fibers B, having a length-weighted average fiber length of 1.35 mm, a maximum distribution fiber length of 1.40 mm, and a CSF of 300 ml, and 10% by mass of lyocell fibers, serving as beaten regenerated cellulose fibers, having a length-weighted average fiber length of 0.23 mm, the lyocell fibers being beaten until the CSF value was 500 ml after the CSF reached 0 ml.

Example 5

A material mixture was formed into paper on a Fourdrinier machine to provide a separator having a thickness of 24.8 µm, a density of 0.60 g/cm³, a tensile strength of 20.6 N/15 mm, the material mixture containing 30% by mass of a straw pulp, serving as natural cellulose fibers A, having a length-weighted average fiber length of 0.58 mm and a CSF of 400 ml, 30% by mass of a bamboo pulp, serving as natural cellulose fibers B, having a length-weighted average fiber length of 1.57 mm, a maximum distribution fiber length of 1.55 mm, a CSF of 200 ml, and 40% by mass of lyocell fibers, serving as beaten regenerated cellulose fibers, having a length-weighted average fiber length of 1.71 mm and a CSF of 10 ml.

Example 6

A material containing 40% by mass of a hardwood kraft pulp serving as natural cellulose fibers A, 30% by mass of a sisal pulp serving as natural cellulose fibers B, and 30% by mass of lyocell fibers serving as regenerated cellulose fibers was beaten with a double-disc refiner to provide a material having a CSF of 90 ml. The components were separately beaten to a CSF of 90 ml under the same beating conditions. The hardwood kraft pulp had a length-weighted average fiber length of 0.57 mm. The sisal pulp had a length-weighted average fiber length of 1.29 mm and a maximum distribution fiber length of 1.25 mm. The lyocell had a length weighted average fiber length of 1.95 mm. The resulting beaten material was formed into paper on a Fourdrinier machine to provide a separator having a thickness of 26.3 µm, a density of 0.58 g/cm³, and a tensile strength of 21.6 N/15 mm.

Example 7

A material containing 40% by mass of a hardwood kraft pulp serving as natural cellulose fibers A and 30% by mass of a sisal pulp serving as natural cellulose fibers B was beaten with a double-disc refiner to provide a material having a CSF of 300 ml. The components were separately beaten to a CSF of 300 ml under the same beating conditions. The hardwood kraft pulp had a length-weighted average fiber length of 0.65 mm. The sisal pulp had a length-weighted average fiber length of 1.56 mm and a maximum distribution fiber length of 1.50 mm. Then 30% by mass of lyocell fibers, serving as beaten regenerated cellulose fibers, having a length-weighted average fiber length of 1.49 mm and a CSF of 3 ml were mixed with the resulting beaten material. The resulting mixture was formed into a sheet of paper on the Fourdrinier part of a Fourdrinier-cylinder paper machine.

An abaca pulp having a length-weighted average fiber length of 3.32 mm, a maximum distribution fiber length of 3.20 mm, and a CSF of 700 ml was formed into a sheet of paper on a cylinder part. The resulting sheets were bonded together in the Fourdrinier-cylinder paper machine to provide a separator having a thickness of 40.7 µm, a density of 0.41 g/cm³, and a tensile strength of 21.6 N/15 mm. The sheet formed on the Fourdrinier part and the sheet formed on the cylinder part each had a thickness of about 20 µm and a density of about 0.41 g/cm³.

Example 8

A material mixture was formed into paper on a Fourdrinier machine to provide a separator having a thickness of 99.5 µm, a density of 0.51 g/cm³, and a tensile strength of 50.0 N/15 mm, the material mixture containing 20% by mass of an esparto pulp, serving as natural cellulose fibers A, having a length-weighted average fiber length of 1.15 mm and a CSF of 480 ml, 30% by mass of a sisal pulp, serving as natural cellulose fibers B, having a length-weighted average fiber length of 1.59 mm, a maximum distribution fiber length of 1.45 mm, and a CSF of 300 ml, and 50% by mass of lyocell fibers, serving as beaten regenerated cellulose fibers, having a length-weighted average fiber length of 1.98 mm and a CSF of 98 ml.

Example 9

A material mixture was formed into paper on a Fourdrinier machine to provide a separator having a thickness of 32.0 µm, a density of 0.49 g/cm³, and a tensile strength of 24.5 N/15 mm, the material mixture containing 40% by mass of a hardwood kraft pulp, serving as natural cellulose fibers A, having a length-weighted average fiber length of 0.62 mm and a CSF of 200 ml, 30% by mass of a sisal pulp, serving as natural cellulose fibers B, having a length-weighted average fiber length of 1.40 mm, a maximum distribution fiber length of 1.40 mm, and a CSF of 200 ml, and 30% by mass of lyocell fibers, serving as beaten regenerated cellulose fibers, having a length-weighted average fiber length of 1.01 mm and a CSF of 0 ml.

Comparative Example 1

A material mixture was formed into paper on a Fourdrinier machine to provide a separator having a thickness of 25.1 µm, a density of 0.64 g/cm³, and a tensile strength of 16.7 N/15 mm, the material mixture containing 80% by mass of a hardwood kraft pulp, serving as natural cellulose fibers A, having a length-weighted average fiber length of 0.26 mm and a CSF of 45 ml, 10% by mass of a sisal pulp, serving as natural cellulose fibers B, having a length-weighted average fiber length of 1.31 mm, a maximum distribution fiber length of 1.30 mm, a CSF of 150 ml, and 10% by mass of lyocell fibers, serving as beaten regenerated cellulose fibers, having a length weighted average fiber length of 1.10 mm and a CSF of 0 ml.

Comparative Example 2

A material mixture was formed into paper on a Fourdrinier machine to provide a separator having a thickness of 41.2 µm, a density of 0.37 g/cm³, and a tensile strength of 18.6 N/15 mm, the material mixture containing 17% by mass of an esparto pulp, serving as natural cellulose fibers A, having a length-weighted average fiber length of 1.24 mm and a CSF of 530 ml, 40% by mass of a sisal pulp, serving as natural cellulose fibers B, having a length-weighted average fiber length of 1.86 mm, a maximum distribution fiber length of 1.80 mm, and a CSF of 460 ml, and 43% by mass of lyocell fibers, serving as beaten regenerated cellulose fibers, having a length-weighted average fiber length of 1.81 mm and a CSF of 70 ml.

Comparative Example 3

A material mixture was formed into paper on a Fourdrinier machine to provide a separator having a thickness of 39.6 µm, a density of 0.41 g/cm³, and a tensile strength of 14.7 N/15 mm, the material mixture containing 84% by mass of a hardwood kraft pulp, serving as natural cellulose fibers A, having a length-weighted average fiber length of 0.69 mm and a CSF of 450 ml, 8% by mass of a kenaf pulp, serving as natural cellulose fibers B, having a length-weighted average fiber length of 1.48 mm, a maximum distribution fiber length of 1.55 mm, and a CSF of 450 ml, and 8% by mass of lyocell fibers, serving as beaten regenerated cellulose fibers, having a length-weighted average fiber length of 1.50 mm and a CSF of 3 ml.

Comparative Example 4

A material mixture was formed into paper on a Fourdrinier machine to provide a separator having a thickness of 39.4 μm, a density of 0.35 g/cm³, and a tensile strength of 23.5 N/15 mm, the material mixture containing 20% by mass of a hardwood kraft pulp, serving as natural cellulose fibers A, having a length-weighted average fiber length of 0.71 mm and a CSF of 460 ml, 55% by mass of a sisal pulp, serving as natural cellulose fibers B, having a length-weighted average fiber length of 2.04 mm, a maximum distribution fiber length of 2.10 mm, and a CSF of 530 ml, and 25% by mass of lyocell fibers, serving as beaten regenerated cellulose fibers, having a length-weighted average fiber length of 0.73 mm and a CSF of 35 ml.

Comparative Example 5

A material mixture was formed into paper on a Fourdrinier machine to provide a separator having a thickness of 27.8 μm, a density of 0.60 g/cm³, a tensile strength of 15.7 N/15 mm, the material mixture containing 30% by mass of a hardwood kraft pulp, serving as natural cellulose fibers A, having a length-weighted average fiber length of 0.71 mm and a CSF of 470 ml, 40% by mass of a softwood kraft pulp, serving as natural cellulose fibers B, having a length-weighted average fiber length of 1.82 mm, a maximum distribution fiber length of 2.05 mm, and a CSF of 480 ml, and 30% by mass of lyocell fibers, serving as beaten regenerated cellulose fibers, having a length-weighted average fiber length of 1.79 mm and a CSF of 60 ml.

Comparative Example 6

A material mixture was formed into paper on a Fourdrinier machine to provide a separator having a thickness of 31.8 μm, a density of 0.51 g/cm³, and a tensile strength of 14.7 N/15 mm, the material mixture containing 23% by mass of a hardwood kraft pulp, serving as natural cellulose fibers A, having a length-weighted average fiber length of 0.38 mm and a CSF of 80 ml, 23% by mass of a sisal pulp, serving as natural cellulose fibers B, having a length-weighted average fiber length of 1.30 mm, a maximum distribution fiber length of 1.25 mm, and a CSF of 140 ml, and 54% by mass of lyocell fibers, serving as beaten regenerated cellulose fibers, having a length weighted average fiber length of 0.44 mm, the lyocell fibers being beaten until the CSF value was 300 ml after the CSF reached 0 ml.

Comparative Example 7

The material mixture of Example 2 was formed into paper on a Fourdrinier machine. The resulting paper was subjected to calender treatment under more stringent conditions than those in Example 2 to provide a separator having a thickness of 14.5 μm, a density of 0.82 g/cm³, and a tensile strength of 21.6 N/15 mm.

Comparative Example 8

A material mixture was formed into paper on a cylinder two-ply paper machine to provide a separator having a thickness of 34.7 μm, a density of 0.47 g/cm³, a tensile strength of 17.6 N/15 mm, the material mixture containing 40% by mass of a hardwood kraft pulp, serving as natural cellulose fibers A, having a length-weighted average fiber length of 0.70 mm and a CSF of 460 ml, 10% by mass of a sisal pulp, serving as natural cellulose fibers B, having a length-weighted average fiber length of 1.95 mm, a maximum distribution fiber length of 1.90 mm, and a CSF of 480 ml, and 50% by mass of lyocell fibers, serving as beaten regenerated cellulose fibers, having a length weighted average fiber length of 0.64 mm, the lyocell fibers being beaten until the CSF value was 110 ml after the CSF reached 0 ml. To examine the influence of the difference between papermaking methods, the material mixture of Comparative example 8 was prepared so as to be equivalent to the material mixture of Example 1.

Comparative Example 9

A material mixture was formed into paper on a Fourdrinier machine to provide a separator having a thickness of 103.8 μm, a density of 0.28 g/cm³, and a tensile strength of 13.7 N/15 mm, the material mixture containing 80% by mass of hardwood mercerized pulp, serving as natural cellulose fibers A, having a length-weighted average fiber length of 0.76 mm and a CSF of 470 ml, 10% by mass of a jute pulp, serving as natural cellulose fibers B, having a length-weighted average fiber length of 1.35 mm, a maximum distribution fiber length of 1.40 mm, and a CSF of 300 ml, and 10% by mass of lyocell fibers, serving as beaten regenerated cellulose fibers, having a length-weighted average fiber length of 1.18 mm and a CSF of 0 ml.

Reference Example 1

A material mixture was formed into paper on a Fourdrinier machine to provide a separator having a thickness of 31.9 μm, a density of 0.50 g/cm³, and a tensile strength of 14.7 N/15 mm, the material mixture containing 60% by mass of a hardwood kraft pulp, serving as natural cellulose fibers A, having a length-weighted average fiber length of 0.63 mm and a CSF of 250 ml and 40% by mass of lyocell fibers, serving as beaten regenerated cellulose fibers, having a length-weighted average fiber length of 1.72 mm and a CSF of 10 ml, in which fibers corresponding to natural cellulose fibers B were not used.

Conventional Example 1

A material obtained by beating lyocell fibers with a double-disc refiner to a length-weighted average fiber length of 1.09 mm and a CSF of 1 ml was formed into paper with a Fourdrinier machine to provide a separator having a thickness of 34.2 μm, a density of 0.40 g/cm³, and a tensile strength of 12.7 N/15 mm.

Conventional Example 2

A material mixture was formed into paper on a Fourdrinier machine to provide a separator having a thickness of 36.3 μm, a density of 0.44 g/cm³, and a tensile strength of 27.4 N/15 mm, the material mixture containing 50% by mass of sisal pulp, serving as natural cellulose fibers B, having a length weighted average fiber length of 1.52 mm, a maximum distribution fiber length of 1.45 mm, a CSF of 250 ml and 50% by mass of lyocell fibers, serving as beaten regenerated cellulose fibers, having a length-weighted average fiber length of 1.73 mm and a CSF of 10 ml, in which fibers corresponding to natural cellulose fibers A were not used.

Conventional Example 3

A material containing 50% by mass of an abaca pulp having a length-weighted average fiber length of 3.21 mm and 50% by mass of an esparto pulp having a length-weighted average fiber length of 1.25 mm was beaten with a double-disc refiner until the CSF was 550 ml. The resulting beaten material was formed into paper on a cylinder two-ply paper machine to provide a separator having a thickness of 90.5 μm, a density of 0.61 g/cm³, and a tensile strength of 108.8 N/15 mm.

Conventional Example 4

A material obtained by beating lyocell fibers with a double-disc refiner to a length-weighted average fiber length of 1.01 mm and a CSF of 0 ml was formed into paper on a Fourdrinier machine to provide a separator having a thickness of 30.6 μm, a density of 0.51 g/cm³, a tensile strength of 14.7 N/15 mm.

In each examples, the total length-weighted average fiber length of the natural cellulose fibers A and the natural cellulose fibers B was in the range of 0.30 to 1.99 mm.

In contrast, in Conventional example 2, the natural cellulose fibers were the sisal alone and had a length-weighted average fiber length of 0.30 to 1.99 mm.

Next, 1,000 aluminum electrolytic capacitors having a rated voltage of 63 WV were produced using a GBL-based electrolytic solution and the separators produced in Examples 1 to 7, Comparative examples 1 to 8, Reference example 1, and Conventional examples 1 and 2. The percent defective was measured, and the impedance (100 kHz) was measured.

Table 1 lists various physical properties of the separators produced in Examples 1 to 7, Comparative examples 1 to 8, Reference example 1, and Conventional examples 1 and 2, the workability in the production of the aluminum electrolytic capacitor elements, and the evaluation results of the aluminum electrolytic capacitors.

Regarding CSF values in Table 1, values with arrows indicate values obtained by allowing beating to proceed further after the CSF reached 0 ml.

TABLE 1

| | | Pulp | Average fiber length mm | Maximum distribution mm | CSF ml | Percentage % | Thickness μm | Density g/cm³ | Tensile strength N/15 mm | Workability | Percent defective % | Impedance Ω |
|---|---|---|---|---|---|---|---|---|---|---|---|---|
| Example 1 | natural fibersA | hardwood KP | 0.72 | 0.85 | 480 | 40 | 34.6 | 0.48 | 16.7 | ○ | 0 | 0.201 |
| | natural fibersB | sisal | 1.96 | 1.90 | 490 | 10 | | | | | | |
| | regenerated cellulose | lyocell | 0.65 | — | ↑120 | 50 | | | | | | |
| Example 2 | natural fibersA | hardwood SP | 0.33 | 0.20 | 55 | 20 | 15.3 (calendered) | 0.78 | 23.5 | ○ | 0.2 | 0.212 |
| | natural fibersB | kenaf | 1.24 | 1.25 | 55 | 50 | | | | | | |
| | regenerated cellulose | polynosic | 1.79 | — | 48 | 30 | | | | | | |
| Example 3 | natural fibersA | hardwood DP | 0.62 | 0.85 | 250 | 50 | 35.4 | 0.45 | 18.6 | ○ | 0 | 0.198 |
| | natural fibersB | jute | 1.33 | 1.40 | 270 | 20 | | | | | | |
| | regenerated cellulose | lyocell | 1.06 | — | 0 | 30 | | | | | | |
| Example 4 | natural fibersA | hardwood MP | 0.66 | 0.70 | 450 | 80 | 60.2 | 0.31 | 15.7 | Δ | 0.1 | 0.181 |
| | natural fibersB | jute | 1.35 | 1.40 | 300 | 10 | | | | | | |
| | regenerated cellulose | lyocell | 0.23 | — | ↑500 | 10 | | | | | | |
| Example 5 | natural fibersA | straw | 0.58 | 0.20 | 400 | 30 | 24.8 | 0.60 | 20.6 | ○ | 0 | 0.209 |
| | natural fibersB | bamboo | 1.57 | 1.55 | 200 | 30 | | | | | | |
| | regenerated cellulose | lyocell | 1.71 | — | 10 | 40 | | | | | | |
| Example 6 | natural fibersA | hardwood KP | 0.57 | 0.50 | 90 | 40 | 26.3 | 0.58 | 21.6 | ○ | 0 | 0.205 |
| | natural fibersB | sisal | 1.29 | 1.25 | 90 | 30 | | | | | | |
| | regenerated cellulose | lyocell | 1.95 | — | 90 | 30 | | | | | | |
| Example 7 | natural fibersA | hardwood KP | 0.65 | 0.70 | 300 | 40 | 40.7 | 0.41 | 21.6 | ○ | 0 | 0.194 |
| | natural fibersB | sisal | 1.56 | 1.50 | 300 | 30 | | | | | | |
| | regenerated cellulose | lyocell | 1.49 | — | 3 | 30 | | | | | | |

TABLE 1-continued

| | | Pulp | Average fiber length mm | Maximum distribution mm | CSF ml | Percentage % | Thickness μm | Density g/cm³ | Tensile strength N/15 mm | Workability | Percent defective % | Impedance Ω |
|---|---|---|---|---|---|---|---|---|---|---|---|---|
| Comparative example 1 | natural fibersA | hardwood KP | 0.26 | 0.20 | 45 | 80 | 25.1 | 0.64 | 16.7 | x | 0.3 | 0.295 |
| | natural fibersB | sisal | 1.31 | 1.30 | 150 | 10 | | | | | | |
| | regenerated cellulose | lyocell | 1.10 | — | 0 | 10 | | | | | | |
| Comparative example 2 | natural fibersA | esparato | 1.24 | 0.60 | 530 | 17 | 41.2 | 0.37 | 18.6 | ○ | 0.8 | 0.226 |
| | natural fibersB | sisal | 1.86 | 1.80 | 460 | 40 | | | | | | |
| | regenerated cellulose | lyocell | 1.81 | — | 70 | 43 | | | | | | |
| Comparative example 3 | natural fibersA | hardwood KP | 0.69 | 0.70 | 450 | 84 | 39.6 | 0.41 | 14.7 | x | 1.3 | 0.244 |
| | natural fibersB | kenaf | 1.48 | 1.55 | 450 | 8 | | | | | | |
| | regenerated cellulose | lyocell | 1.50 | — | 3 | 8 | | | | | | |
| Comparative example 4 | natural fibersA | hardwood KP | 0.71 | 0.80 | 460 | 20 | 39.4 | 0.35 | 23.5 | ○ | 0.9 | 0.237 |
| | natural fibersB | sisal | 2.04 | 2.10 | 530 | 55 | | | | | | |
| | regenerated cellulose | lyocell | 0.73 | — | 35 | 25 | | | | | | |
| Comparative example 5 | natural fibersA | hardwood KP | 0.71 | 0.70 | 470 | 30 | 27.8 | 0.60 | 15.7 | x | 2.5 | 0.286 |
| | natural fibersB | softwood KP | 1.82 | 2.05 | 480 | 40 | | | | | | |
| | regenerated cellulose | lyocell | 1.79 | — | 60 | 30 | | | | | | |
| Comparative example 6 | natural fibersA | hardwood KP | 0.38 | 0.25 | 80 | 23 | 31.8 | 0.51 | 14.7 | ○ | 0.3 | 0.208 |
| | natural fibersB | sisal | 1.30 | 1.25 | 140 | 23 | | | | | | |
| | regenerated cellulose | lyocell | 0.44 | — | ↑300 | 54 | | | | | | |
| Comparative example 7 | natural fibersA | hardwood SP | 0.33 | 0.20 | 55 | 20 | 14.5 (calendered) | 0.82 | 21.6 | Δ | 1.0 | 0.301 |
| | natural fibersB | kenaf | 1.24 | 1.25 | 55 | 50 | | | | | | |
| | regenerated cellulose | polynosic | 1.79 | — | 48 | 30 | | | | | | |
| Comparative example 8 | natural fibersA | hardwood KP | 0.70 | 0.75 | 460 | 40 | 34.7 | 0.47 | 17.6 | ○ | 3.3 | 0.227 |
| | natural fibersB | sisal | 1.95 | 1.90 | 480 | 10 | | | | | | |
| | regenerated cellulose | lyocell | 0.64 | — | ↑110 | 50 | | | | | | |
| Reference example 1 | natural fibersA | hardwood KP | 0.63 | — | 250 | 60 | 31.9 | 0.50 | 14.7 | x | 0.2 | 0.237 |
| | natural fibersB | — | — | — | — | 0 | | | | | | |
| | regenerated cellulose | lyocell | 1.72 | — | 10 | 40 | | | | | | |
| Conventional example 1 | | — | — | — | — | — | 34.2 | 0.40 | 12.7 | x | 0.3 | 0.194 |
| | | — | — | — | — | — | | | | | | |
| | regenerated cellulose | lyocell | 1.09 | — | 1 | 100 | | | | | | |
| Conventional example 2 | natural fibersA | — | — | — | — | 0 | 36.3 | 0.44 | 27.4 | ○ | 1.3 | 0.299 |
| | natural fibersB | sisal | 1.52 | 1.45 | 250 | 50 | | | | | | |
| | regenerated cellulose | lyocell | 1.73 | — | 10 | 50 | | | | | | |

The separator of Conventional example 1, the separator being formed of the beaten regenerated cellulose fibers alone, had a tensile strength of 12.7 N/15 mm. In contrast, each of the separators of Examples 1 to 7, each separator being formed of the natural cellulose fibers A, the natural cellulose fibers B, and the regenerated cellulose fibers, had a tensile strength of not less than 15.7 N/15 mm. Each of the separators of Comparative examples 1 to 8, each separator being formed of the natural cellulose fibers and the regenerated cellulose fibers, had a tensile strength of not less than 14.7 N/15 mm.

The workability in the production of the capacitor including the separator of Conventional example 1, the separator being formed of the beaten regenerated cellulose fibers alone, was rated as x. Regarding the separators of Examples 1 to 7, each separator being formed of the natural cellulose fibers A, the natural cellulose fibers B, and the regenerated cellulose fibers, six separators were rated as ○ in workability, and one separator was rated as Δ in workability. Regarding the separators of Comparative examples 1 to 8, Reference example 1, and Conventional example 2, each of the separators being formed of the natural cellulose fibers and the regenerated cellulose fibers, five separators were rated as ○ in workability, one separator was rated as Δ in workability, and four separators were rated as x in workability.

The percent defective of the capacitors including the separators of Conventional example 1, each separator being formed of the beaten regenerated cellulose fibers alone, was 0.3%. In contrast, the percent defective of the capacitors including the separators of Examples 1 to 7, each separator being formed of the natural cellulose fibers A, the natural cellulose fibers B, and the regenerated cellulose fibers, was 0% to 0.2%. The percent defective of the capacitors including the separators of Comparative examples 1 to 8, Reference example 1, and Conventional example 2, each separator being formed of the natural cellulose fibers and the regenerated cellulose fibers, was 0.2% to 3.3%.

The capacitors including the separators of Conventional example 1, each separator being formed of the beaten regenerated cellulose fibers alone, had an impedance of 0.194Ω. The capacitors including the separators of Examples 1 to 7, each separator being formed of the natural cellulose fibers A, the natural cellulose fibers B, and the regenerated cellulose fibers, had an impedance of 0.181 to 0.212Ω (a rate of improvement of 7.7% to a rate of deterioration of 9.3%, as compared with Conventional example 1). The capacitors including the separators of Comparative examples 1 to 8, Reference example 1, and Conventional example 2, each separator being formed of the natural cellulose fibers and the regenerated cellulose fibers, had an impedance of 0.208 to 0.301Ω (a rate of deterioration of 7.2% to 55.2%, as compared with Conventional example 1).

The separator of Conventional example 1 has a thickness of 34.2 μm. In contrast, the separator of Example 2 has a thickness of 15.3 μm. When the separator of Conventional example 1 is replaced with the separator of Example 2, it is possible to reduce the thickness of the separator without degrading the percent defective or the impedance characteristics. Thus, if the capacitor has the same capacitance, it is possible to reduce the volume of the capacitor element to miniaturize the capacitor. If the capacitor has the same size, it is possible to increase the length of the electrode foil to increase the capacitance.

The separators of Examples 1 to 7, each separator including the ply formed on the Fourdrinier machine and being formed of 20% to 80% by mass of the natural cellulose fibers A having a length-weighted average fiber length of 0.30 to 1.19 mm and a CSF of 500 to 50 ml, 10% to 50% by mass of the natural cellulose fibers B having a length-weighted average fiber length of 1.20 to 1.99 mm, a maximum distribution fiber length of 1.20 to 1.99 mm, and a CSF of 500 to 50 ml, and 10% to 50% by mass of the beaten regenerated cellulose fibers, had improved tensile strength while the degradation of the impedance characteristics of the capacitors was inhibited, compared with the separator of Conventional example 1. The improved tensile strength reduces the number of occurrences of separator breakage to significantly improve the productivity. The improved tensile strength improves resistance to tab portions and foil burrs, thus reducing the percent defective.

The separator of Conventional example 2 is formed of only the natural cellulose fibers B and the regenerated cellulose fibers. Because of a high content of the natural cellulose fibers B, which easily improve the tensile strength, the workability in the production of the capacitor element was improved, compared with Conventional example 1. However, because the natural cellulose fibers B were beaten to a CSF value of 250 ml in order to inhibit the degradation of the formation, the impedance characteristics were markedly degraded. As described in prior literature, in the case where a sisal pulp that is little beaten and that has a CSF value of, for example, 700 ml is used, although the capacitors have impedance characteristics with sufficient levels for practical use, the degradation of the formation markedly decreases the percent defective.

The separator of Reference example 1 is formed of only the natural cellulose fibers A and the refined regenerated cellulose fibers. The natural cellulose fibers A are less effective in improving the tensile strength than the natural cellulose fibers B. Thus, the workability in the production of the capacitor element was not clearly improved, compared with Conventional example 1. The tensile strength was slightly improved while the degree of denseness was comparable to that of Conventional example 1, thus slightly improving the percent defective of the capacitors. The capacitors had impedance characteristics with sufficient levels for practical use without problems.

The results of Conventional example 2 and Reference example 1 demonstrated that it is difficult to significantly improve the workability in the production of capacitor elements by the use of the natural cellulose fibers A alone and that the natural cellulose fibers B are required. It was also found that in the case of the composition formed of only the natural cellulose fibers B and the regenerated cellulose fibers, although the workability in the production of the capacitor elements is improved, it is difficult to achieve the percent defective and the impedance characteristics of the capacitors with sufficient levels for practical use, and the natural cellulose fibers A are required.

Only the use of the three components of the natural cellulose fibers A having the effects of improving the formation and the tensile strength, the natural cellulose fibers B having the effect of markedly improving the tensile strength, and the regenerated cellulose fibers that provide good denseness improves the workability in the production of the capacitor elements and provides both of a good percent defective and good impedance characteristics of the capacitors.

The separator of Comparative example 1 contains 80% by mass of the hardwood kraft pulp, serving as the natural cellulose fibers A, beaten to a CSF of 45 ml and a length-weighted average fiber length of 0.26 mm. Because the length-weighted average fiber length was less than 0.30 mm, the effect of improving the tensile strength was low. Furthermore, the tensile strength was decreased, thus failing to improve the workability in the production of the capacitor element. Because the beating was performed to a CSF of 45 ml, the impedance of the capacitor was degraded. Comparisons with Conventional example 1 are summarized as follows: the overall strength and the short-circuit resistance were not changed, and only the impedance characteristics were degraded.

The separator of Comparative example 2 contains 17% by mass of the esparto pulp, serving as the natural cellulose fibers A, having a length-weighted average fiber length of 1.24 mm and a CSF of 530 ml. The esparto pulp has a maximum distribution fiber length of 0.60 mm and thus is not categorized into the natural cellulose fibers B in the present invention. Because the esparto pulp had a length-weighted average fiber length of more than 1.19 mm, the tensile strength was more improved than the cases where the usual natural cellulose fibers A were used. This improved the workability in the production of the element. However, because of the long length-weighted average fiber length, insufficient beating treatment, and a low content of the natural cellulose fibers A, the formation was degraded to decrease the denseness, thus resulting in a higher percent defective than that of Conventional example 1.

The separator of Comparative example 3 contains 84% by mass of the hardwood kraft pulp, serving as the natural cellulose fibers A, having a length-weighted average fiber length of 0.69 mm and a CSF of 450 ml. Because of a high content of the natural cellulose fibers A, each of the contents of the natural cellulose fibers B and the regenerated cellulose fibers was 8% by mass. Because of the low content of the natural cellulose fibers B, the tensile strength was only slightly improved, compared with Conventional example 1; thus, the workability in the production of the element was not improved. The low content of the regenerated cellulose fibers markedly degrades the denseness of the separator to significantly degrade the percent defective. Because the fiber length parameter and the CSF value of each of the natural cellulose fibers A, the natural cellulose fibers B, and the regenerated cellulose fibers were within the ranges of the present invention, the impedance characteristics were sufficient for practical use.

The results of Comparative examples 1 to 3 indicate that 20% to 80% by mass of fibers having a length-weighted average fiber length of 0.30 to 1.19 mm and a CSF of 500 to 50 ml are required to be used as the natural cellulose fibers A used in the present invention.

The separator of Comparative example 4 contains 55% by mass of the sisal pulp, serving as the natural cellulose fibers B, having a length-weighted average fiber length of 2.04 mm, a maximum distribution fiber length of 2.10 mm, and a CSF of 530 ml. The long length-weighted average fiber length and the long maximum distribution fiber length were effective in improving the tensile strength and thus improve the workability in the production of the capacitor element, compared with Conventional example 1. However, because of the high CSF value, insufficient beating treatment, and the high content in addition to the long length-weighted average fiber length and the long maximum distribution fiber length, the formation was significantly degraded to decrease the short-circuit resistance; thus, the percent defective of the capacitors was more degraded than Conventional example 1.

The separator of Comparative example 5 contains 40% by mass of the softwood kraft pulp, serving as the natural cellulose fibers B, having a length-weighted average fiber length of 1.82 mm, a maximum distribution fiber length of 2.05 mm, and a CSF of 480 ml. The natural cellulose fibers B had a broad fiber length distribution and thus were less effective in improving the tensile strength to fail to improve the workability in the production of the capacitor element. Furthermore, the high content of long fibers 2.00 mm or more in length degraded the formation, and the percent defective was much more degraded than Example 1.

The results of Comparative examples 3 to 5 indicate that 10% to 50% by mass of fibers having a length-weighted average fiber length of 1.20 to 1.99 mm, a maximum distribution fiber length of 1.20 to 1.99 mm, and a CSF of 500 to 50 ml are required to be used as the natural cellulose fibers B used in the present invention.

The separator of Comparative example 6 contains 54% by mass of the lyocell fibers, serving as the beaten regenerated cellulose fibers, having a length-weighted average fiber length of 0.44 mm, the lyocell fibers being beaten until the CSF value was 300 ml after the CSF reached 0 ml. The high content of the regenerated cellulose weakened the effect of the incorporation of the natural cellulose fibers A and the natural cellulose fibers B on the improvement in tensile strength. This results in failure to improve the workability in the production of the capacitor element, compared with Example 1. The results of Comparative examples 3 and 6 indicate that the content of the beaten regenerated cellulose fibers used in the present invention is required to be 10% to 50% by mass.

The separator of Comparative example 7 has a thickness of 14.5 μm and a density of 0.82 g/cm$^3$, the separator being produced by making paper with the same materials and the same papermaking machine as those in Example 2 and then subjecting the paper to calender treatment under more stringent conditions. Because the thickness was thinner than 15 μm, the tensile strength was lower than that of the separator of Example 2, thus degrading the workability in the production of the capacitor element. Because the interelectrode distance was reduced, the percent defective of the capacitors was more increased than Example 2. Because the density was increased, the impedance characteristics were significantly degraded, compared with the capacitor of Example 2. The separator of the present invention is required to have a thickness of 15 μm or more and a density of 0.80 g/cm$^3$ or less.

The separator of Comparative example 8 is a two-ply separator formed on the cylinder two-ply paper machine using substantially the same materials as in Example 1. The tensile strength was substantially equivalent to that of the separator of Example 1 formed on the Fourdrinier machine. The workability in the production of the capacitor element was also equivalent thereto. However, many pinholes originating from the cylinder paper machine were present, thus significantly degrading the percent defective to 3.3%. It is important that the separator of the present invention include at least one ply formed on the Fourdrinier machine.

First, 1,000 aluminum electrolytic capacitors were produced using a GBL-based electrolytic solution and the separators produced in Example 8, Comparative example 9, and Conventional example 3, the aluminum electrolytic capacitors having a working voltage of 450 WV. The percent defective was measured. The impedance (100 kHz) was measured.

Table 2 lists the various physical properties of the separators produced in Example 8, Comparative example 9, and Conventional example 3, the workability in the production of the aluminum electrolytic capacitor elements, and the evaluation results of the aluminum electrolytic capacitors.

TABLE 2

|  | Pulp | | Average fiber length mm | Maximum distribution mm | CSF ml | Percentage % | Thickness μm | Density g/cm3 | Tensile strength N/15 mm | Workability | Percent defective % | Impedance Ω |
|---|---|---|---|---|---|---|---|---|---|---|---|---|
| Example 8 | natural fibersA | esparto | 1.15 | 0.55 | 480 | 20 | 99.5 | 0.51 | 50.0 | ○ | 0.0 | 28.47 |
|  | natural fibersB | sisal | 1.58 | 1.45 | 300 | 30 | | | | | | |
|  | regenerated cellulose | lyocell | 1.98 | — | 98 | 50 | | | | | | |
| Comparative example 9 | natural fibersA | hardwood MP | 0.76 | 0.80 | 470 | 80 | 103.8 | 0.28 | 13.7 | Δ | 0.8 | 38.30 |
|  | natural fibersB | jute | 1.35 | 1.40 | 300 | 10 | | | | | | |
|  | regenerated cellulose | lyocell | 1.18 | — | 0 | 10 | | | | | | |
| Conventional example 3 | | abaca | 3.21 | — | 550 | 50 | 90.5 | 0.61 | 108.8 | ○ | 0.8 | 40.12 |
|  | | esparto | 1.25 | — | 550 | 50 | | | | | | |

Compared with the separator of Conventional example 3, the separator of Example 8 had low tensile strength and sufficient strength; thus, the workability in the production of the capacitor element was not decreased. Because of differences in material and papermaking method, the denseness of the separator of Example 8 was significantly higher than that of the separator of Conventional example 3; thus, the percent defective was 0%. An about 30% reduction in impedance was achieved by only the replacement of the separator.

The separator of Comparative example 9 has a thickness of 103.8 μm and a density of 0.28 g/cm³. Because of the low density, the tensile strength was low; thus, the workability in the production of the capacitor element was rated as A. Despite a thickness of 103.8 μm, the density was low; thus, the short-circuit resistance was low, and the percent defective was 0.8%. Because of the excessively large interelectrode distance due to the large thickness of the separator, the impedance characteristics were little different from those of Conventional example 3. The results of Example 8 and Comparative example 9 indicate that the separator of the present invention preferably has a thickness of 100 μm or less and a density of 0.30 g/cm³ or more.

Next, 1,000 wound electric double-layer capacitors were produced using the separators produced in Example 9 and Conventional 4. The internal resistance, the leakage current, and the percentage of defective products due to short circuits were measured.

In the case of the wound electric double-layer capacitors including the separators of Conventional example 4, the workability in the production thereof was rated as x. The internal resistance was 88 mΩ. The leakage current was 350 μA. The percent defective was 0%.

In the case of the wound electric double-layer capacitors including the separators of Example 9, the workability in the production thereof was rated as ○. The internal resistance was 103 mΩ. The leakage current was 289 μA. The percent defective was 0%. An improvement in productivity owing to the improvement in workability was obtained, and a reduction in leakage current was obtained.

An aluminum electrolytic capacitor having a rated voltage of 63 WV was produced using the separator of Example 9 and an ethylene glycol-based electrolytic solution. The produced aluminum electrolytic capacitor functioned without problems.

A conductive polymer aluminum solid electrolytic capacitor was produced using the separator of Example 9.

Anode foil that had been subjected to etching treatment and oxide film formation treatment and cathode foil were wound with the separator provided therebetween so as not to come into contact with each other to produce a capacitor element. The resulting capacitor element was subjected to chemical conversion treatment, followed by drying. The capacitor element was impregnated with a polymerizable liquid. The polymerizable liquid was polymerized by heating. The evaporation of a solvent resulted in the formation of a conductive polymer. The capacitor element was placed in a predetermined case. An opening portion was sealed. Aging was performed to provide the conductive polymer aluminum solid electrolytic capacitor having a rated voltage of 6.3 WV, a diameter of 10 mm, and a height of 20 mm. The resulting conductive polymer aluminum solid electrolytic capacitor functioned without problems.

A conductive polymer hybrid aluminum electrolytic capacitor was produced using the separator of Example 9.

Anode foil that had been subjected to etching treatment and oxide film formation treatment and cathode foil were wound with the separator provided therebetween so as not to come into contact with each other to produce a capacitor element. The resulting capacitor element was subjected to chemical conversion treatment, followed by drying. The capacitor element was impregnated with a dispersion and heated. A solvent was evaporated to form a conductive polymer. Subsequently, the capacitor element, was impregnated with an electrolytic solution for operation. The capacitor element was placed in a predetermined case. An opening portion was sealed. Aging was performed to provide the conductive polymer hybrid aluminum electrolytic capacitor having a rated voltage of 80 WV, a diameter of 10 mm, and a height of 20 mm. The resulting conductive polymer hybrid aluminum electrolytic capacitor functioned without problems.

A stacked electric double layer capacitor was produced using the separator of Example 9.

Activated carbon electrodes and the separator were alternately folded to form an electric double-layer capacitor element. The element was placed in an aluminum case, an electrolytic solution containing triethylmethylammonium hexafluorophosphate dissolved in acetonitrile was injected thereinto. After vacuum impregnation was performed, the case was sealed to provide the electric double-layer capacitor. The resulting stacked electric double-layer capacitor functioned without problems.

A lithium-ion capacitor was produced using the separator of Example 9.

An activated carbon electrode for a lithium-ion capacitor was used as a positive electrode material. A graphite electrode was used as a negative electrode material. The separator and the electrode materials were alternately folded to form a lithium-ion capacitor element. The element was placed in a multilayer laminated film together with foil for lithium pre-doping. An electrolytic solution was injected thereinto. After vacuum impregnation was performed the element was sealed to provide the lithium-ion capacitor. As the electrolytic solution, a solution containing lithium hexafluorophosphate, serving as an electrolyte, dissolved in a propylene carbonate solvent was used. The resulting lithium-ion capacitor functioned without problems.

A lithium-ion secondary battery was produced using the separator of Example 9.

A lithium cobalt oxide electrode for a lithium-ion secondary battery was used as a positive electrode material. A graphite electrode was used as a negative electrode material. The electrodes were wound with the separator to form a lithium-ion secondary battery element. The element was placed in a cylindrical case with a bottom. An electrolytic solution containing tetraethylammonium tetrafluoroborate, serving as an electrolyte, dissolved in a propylene carbonate solvent was injected thereinto. The case was sealed using a pressing machine to provide the lithium-ion secondary battery. The resulting lithium-ion secondary battery functioned without problems.

A lithium primary battery was produced using the separator of Example 9.

A positive electrode mixture was formed by compacting a mixture of heat-treated manganese dioxide, a conductive agent such as a carbon powder, and a binder such as a fluororesin into a hollow cylinder. The hollow cylinder was arranged so as to be in close contact with the inner periphery of a battery case. The separator that had been formed into a cylinder was arranged so as to be in close contact with the inner periphery of the positive electrode mixture. The separator was impregnated with an electrolytic solution until the separator wetted sufficiently, the electrolytic solution being prepared by dissolving $LiClO_4$ in a propylene carbonate/1,2-dimethoxyethane (1:1, by weight) mixed solution. A negative electrode member obtained by cutting a metallic lithium sheet into a predetermined size was rolled and arranged so as to be in close contact with the inner periphery of the separator. The case was sealed by crimping with a gasket, thereby providing a cylindrical lithium primary battery. The resulting lithium primary battery functioned without problems.

The results indicate that according to the embodiments, a separator having improved tensile strength and short-circuit resistance can be provided while maintaining the denseness and the impedance characteristics comparable to those of a separator formed of highly beaten regenerated cellulose fibers, the separator containing 20% to 80% by mass of natural cellulose fibers A being formed of a length-weighted average fiber length of 0.30 to 1.19 mm and a CSF of 500 to 50 ml, 10% to 50% by mass of natural cellulose fibers B having a length-weighted average fiber length of 1.20 to 1.99 mm, a maximum distribution fiber length of 1.20 to 1.99 mm, and a CSF of 500 to 50 ml, and 10% to 50% by mass of beaten regenerated cellulose fibers. The use of the separator provides a miniaturized or higher-capacity electrochemical element having improved productivity and an improved percentage of defective products due to short circuits.

INDUSTRIAL APPLICABILITY

The separator for an electrochemical element according to the present invention can be used for various electrochemical elements such as aluminum electrolytic capacitors, conductive polymer aluminum solid electrolytic capacitors, conductive polymer hybrid aluminum electrolytic capacitors, electric double-layer capacitors, lithium-ion capacitors, lithium-ion secondary batteries, and lithium primary batteries.

The invention claimed is:

1. A separator, comprising:
   20% to 80% by mass of natural cellulose fibers A having a length-weighted average fiber length of 0.30 mm to 1.19 mm and a CSF of 500 ml to 50 ml;
   10% to 50% by mass of natural cellulose fibers B having a length-weighted average fiber length of 1.20 min to 1.99 mm, a maximum distribution fiber length of 1.20 mm to 1.99 mm, and a CSF of 500 ml to 50 ml; and
   10% to 50% by mass of beaten regenerated cellulose fibers,
   wherein:
   the separator is interposed between a pair of electrodes;
   the separator is capable of holding an electrolytic solution comprising an electrolyte; and
   the separator has a thickness of 15 μm to 100 μm and a density of 0.30 g/cm$^3$ to 0.80 g/cm$^3$.

2. The separator according to claim 1, wherein the natural cellulose fibers A are at least one selected from hardwood pulps, esparto pulps, and straw pulps.

3. The separator according to claim 1, wherein the natural cellulose fibers B are at least one selected from sisal pulps, jute pulps, kenaf pulps, and bamboo pulps.

4. An electrochemical element comprising the separator according to claim 1.

5. The electrochemical element according to claim 4, wherein the electrochemical element is an aluminum electrolytic capacitor.

6. The electrochemical element according to claim 4, wherein the electrochemical element is a conductive polymer aluminum solid electrolytic capacitor.

7. The electrochemical element according to claim 4, wherein the electrochemical element is a conductive polymer hybrid aluminum electrolytic capacitor.

8. The electrochemical element according to claim 4, wherein the electrochemical element is an electric double-layer capacitor.

9. The electrochemical element according to claim 4, wherein the electrochemical element is a lithium-ion capacitor.

10. The electrochemical element according to claim 4, wherein the electrochemical element is a lithium-ion secondary battery.

11. The electrochemical element according to claim 4, wherein the electrochemical element is a lithium primary battery.

* * * * *